United States Patent
Lenz et al.

(10) Patent No.: US 10,076,929 B1
(45) Date of Patent: Sep. 18, 2018

(54) BICYCLE HAVING A WIDENED REAR WHEEL

(71) Applicants: Eric D. Lenz, Greendale, WI (US); Jeffrey R. Gaudynski, West Allis, WI (US)

(72) Inventors: Eric D. Lenz, Greendale, WI (US); Jeffrey R. Gaudynski, West Allis, WI (US)

( * ) Notice: Subject to any disclaimer, the term of this patent is extended or adjusted under 35 U.S.C. 154(b) by 32 days.

(21) Appl. No.: 15/401,128

(22) Filed: Jan. 9, 2017

Related U.S. Application Data

(60) Provisional application No. 62/279,973, filed on Jan. 18, 2016.

(51) Int. Cl.
| | |
|---|---|
| *B60B 11/04* | (2006.01) |
| *B62K 3/02* | (2006.01) |
| *B62K 19/30* | (2006.01) |
| *B62M 3/00* | (2006.01) |
| *B60B 11/06* | (2006.01) |

(52) U.S. Cl.
CPC .............. *B60B 11/04* (2013.01); *B60B 11/06* (2013.01); *B62K 3/02* (2013.01); *B62K 19/30* (2013.01); *B62M 3/003* (2013.01); *B60B 2900/3312* (2013.01); *B60Y 2200/13* (2013.01); *B62K 2700/20* (2013.01)

(58) Field of Classification Search
CPC ................................. B60B 11/04; B60B 11/06
See application file for complete search history.

(56) References Cited

U.S. PATENT DOCUMENTS

| | | | | |
|---|---|---|---|---|
| 2,259,022 A * | 10/1941 | Clark | ...................... | B60B 11/06 301/35.627 |
| 2,416,862 A * | 3/1947 | Baker | ...................... | B60B 11/06 301/13.1 |
| 2,751,959 A * | 6/1956 | Blomquist | .............. | B60B 11/00 152/158 |
| 2,918,328 A * | 12/1959 | Walls | ...................... | B60B 11/06 152/376 |
| 3,110,379 A * | 11/1963 | Baker, III | ................ | B62L 5/16 192/217.3 |
| 3,170,549 A * | 2/1965 | Baker, III | ................ | B62L 5/00 192/217.6 |
| 3,532,384 A * | 10/1970 | Williams, Jr. | ............ | B60B 3/16 301/128 |
| 3,913,981 A * | 10/1975 | Hunden | .................. | B60B 11/04 29/894.32 |

(Continued)

*Primary Examiner* — Anne Marie M Boehler
*Assistant Examiner* — Michael R Stabley
(74) *Attorney, Agent, or Firm* — Donald J. Ersler

(57) ABSTRACT

A bicycle having a widened rear wheel preferably includes an existing bicycle, a double tire rear wheel, a widened crank tube, a widened crank and widened rear fork. The existing bicycle includes a bicycle frame, a front wheel, handlebars, and a seat. The bicycle frame includes a frame unit and a crank set. The frame unit includes a base frame portion, a front fork and a rear fork. The base frame portion includes a top tube, a seat tube, a down tube and a crank tube. The crank tube is replaced with the widened crank tube. The rear fork is replaced with a widened rear fork. A crank of the crank set is replaced with the widened crank. The widened rear wheel preferably includes three bicycle tire rims, a plurality of spokes, two tires and a lengthened rear wheel hub.

17 Claims, 5 Drawing Sheets

(56) References Cited

U.S. PATENT DOCUMENTS

| | | | | |
|---|---|---|---|---|
| 4,070,066 A * | 1/1978 | Reppert | B60B 11/02 | 301/36.1 |
| 4,124,051 A * | 11/1978 | Horton | B60B 9/00 | 152/155 |
| 4,220,372 A * | 9/1980 | Johansen | B60B 11/02 | 301/1 |
| 4,765,383 A * | 8/1988 | Bott | B60B 11/04 | 137/224 |
| 4,782,876 A * | 11/1988 | Juhan | B60B 11/04 | 152/340.1 |
| 4,880,279 A * | 11/1989 | Flesche | B60B 11/04 | 301/114 |
| 4,909,537 A | 3/1990 | Tratner | | |
| 4,925,250 A * | 5/1990 | Sorrentino | B60B 11/04 | 301/13.1 |
| 5,474,144 A | 12/1995 | Tarng | | |
| 5,788,335 A * | 8/1998 | O'Brien | B60B 15/26 | 301/40.6 |
| 5,906,418 A * | 5/1999 | Cullen | B60B 11/06 | 301/35.628 |
| 6,019,385 A * | 2/2000 | Kelley | B60T 1/10 | 280/217 |
| 6,022,082 A * | 2/2000 | O'Brien | B60B 15/263 | 152/216 |
| 6,044,883 A * | 4/2000 | Noyes | B60C 27/22 | 152/210 |
| 6,390,564 B1 * | 5/2002 | Thomas | B60B 11/00 | 301/13.2 |
| 6,637,834 B2 * | 10/2003 | Elkow | B60C 5/22 | 152/415 |
| 8,382,135 B1 * | 2/2013 | Raike, III | B62M 29/00 | 152/209.11 |
| 8,672,339 B2 * | 3/2014 | Raike, III | B62M 29/00 | 152/209.11 |
| 8,690,265 B2 * | 4/2014 | Noblanc | B60B 11/02 | 301/36.1 |
| 9,284,009 B2 | 3/2016 | Raike, III et al. | | |
| 9,744,804 B2 * | 8/2017 | Pope | B60B 11/06 | |
| 2005/0088035 A1 * | 4/2005 | Bonaldi | B60B 11/04 | 301/36.1 |
| 2010/0194180 A1 * | 8/2010 | Gibson | B60B 11/04 | 301/36.1 |
| 2012/0074762 A1 * | 3/2012 | Pope | B60B 11/04 | 301/36.1 |
| 2014/0117746 A1 * | 5/2014 | Pope | B60B 11/06 | 301/35.628 |

* cited by examiner

BICYCLE HAVING A WIDENED REAR WHEEL

CROSS-REFERENCES TO RELATED APPLICATIONS

This is a utility patent application taking priority from provisional application No. 62/279,973 filed on Jan. 18, 2016.

BACKGROUND OF THE INVENTION

Field of the Invention

The present invention relates generally to cycling and more specifically to a bicycle having a widened rear wheel, which is appropriate for a bicycle rider with poor balance.

Discussion of the Prior Art

U.S. Pat. No. 4,909,537 to Tratner discloses a universal vehicle for pedaling or the like. U.S. Pat. No. 5,474,144 to Tarng discloses a twin-wheel motorcar with differential height and speed mechanisms. U.S. Pat. No. 9,284,009 to Raike, III et al. discloses a sand-rideable bicycle with positive traction gear assembly.

Accordingly, there is a clearly felt need in the art for a bicycle having a widened rear wheel, which is appropriate for a bicycle rider with poor balance.

SUMMARY OF THE INVENTION

The present invention provides a bicycle having a widened rear wheel, which is appropriate for a bicycle rider with poor balance. The bicycle having a widened rear wheel preferably includes an existing bicycle, a double tire rear wheel, a widened crank tube, a widened crank and a widened rear fork. The existing bicycle includes a bicycle frame, a front wheel, handlebars, and a seat. An adult bicycle is shown at http://www.jimlangley.net/wrench/bicycleparts.html and is hereby incorporated by reference in its entirety. The bicycle frame includes a frame unit and a crank set. The frame unit includes a base frame portion, a front fork and a rear fork. The base frame portion includes a top tube, a seat tube, a down tube and a crank tube. The crank tube is replaced with the widened crank tube. The rear fork is replaced with a widened rear fork. The widened rear fork preferably includes two rear stays and a seat cross tube or a stay cross tube. Each rear stay includes a chain stay, a seat stay and a rear drop out. One end of the chain stay and the seat stay extend from the rear drop out. Opposing ends of the two chain stays are attached to the widened crank tube. The seat cross tube is attached to an upper portion of the seat tube. Opposing ends of the seat stays are attached to the seat cross tube. Each end of the stay cross tube is retained between the two seat stays. A crank of the crank set is replaced with the widened crank.

The widened rear wheel preferably includes three bicycle tire rims, a plurality of spokes, two tires and a lengthened rear wheel hub. Side perimeters of the three bicycle tire rims are attached to each other with any suitable process, such as welding to form a rear rim wheel. The lengthened rear wheel hub preferably includes an existing hub, a lengthened axle, an offset brake arm and a second drive screw. The existing hub axle is replaced with the lengthened axle. The existing brake arm is replaced with the offset brake arm. The second drive screw is concentrically attached to an end of the existing drive screw with welding or the like. The lengthened rear wheel hub is secured to a center rim of the rear rim wheel with the plurality of spokes. The two tires are secured to the two outer bicycle tire rims. The lengthened axle is secured to the two rear drop outs. The offset brake arm is secured to one of the chain stays. A chain is attached to a driven gear of the existing hub and a drive gear of the crank set. The bicycle having a widened rear wheel does not require a kick stand, but will stand on its own. The widened rear wheel provides resting stability.

Accordingly, it is an object of the present invention to provide a bicycle having a widened rear wheel, which is appropriate for a bicycle rider with poor balance.

These and additional objects, advantages, features and benefits of the present invention will become apparent from the following specification.

DETAILED DESCRIPTION OF THE PREFERRED EMBODIMENTS

Figure 1:
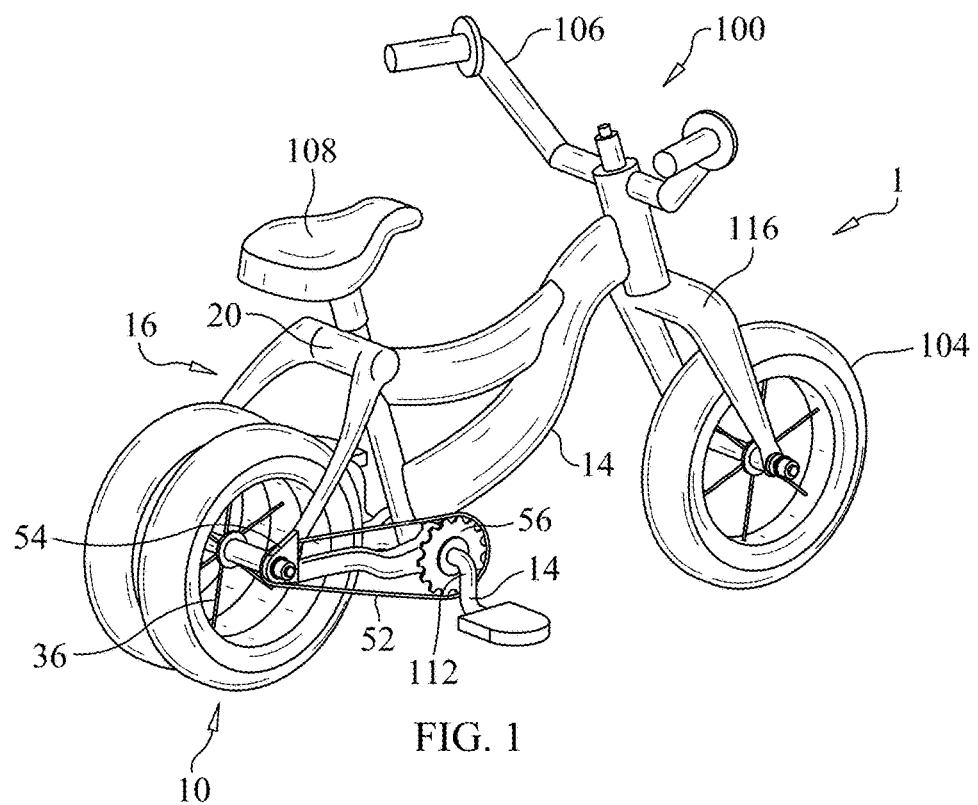
FIG. 1 is a perspective view of a bicycle having a widened rear wheel in accordance with the present invention.
Figure 2:
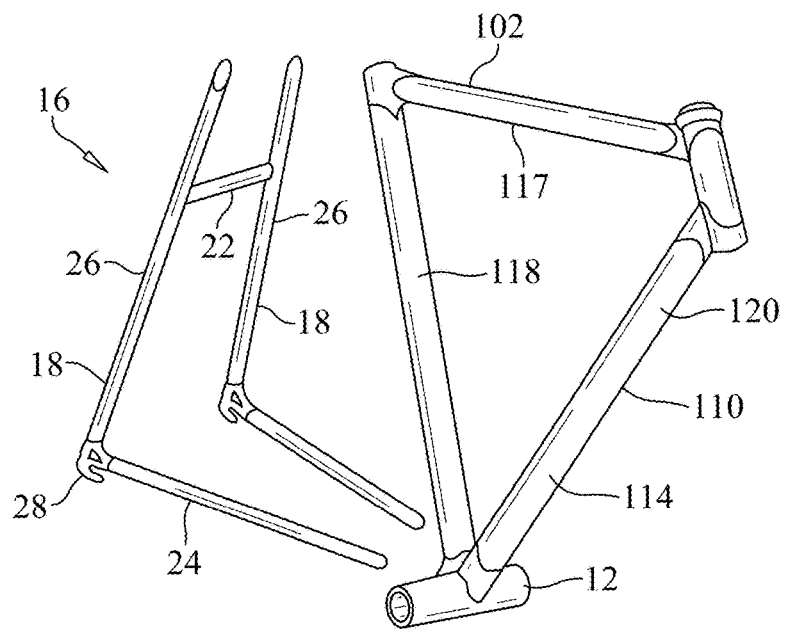
FIG. 2 is a partially exploded perspective view of a bicycle frame of a bicycle having a widened rear wheel in accordance with the present invention.
Figure 3:
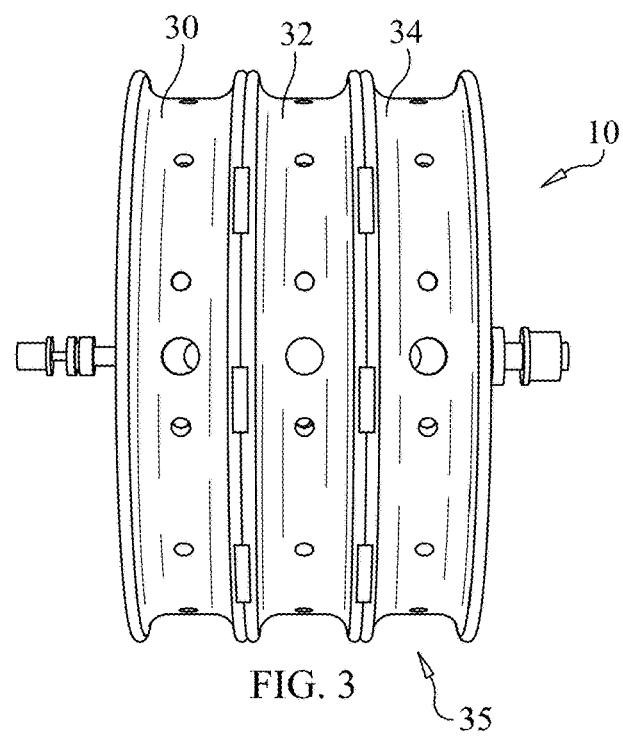
FIG. 3 is a side view of a widened rear wheel without tires of a bicycle having a widened rear wheel in accordance with the present invention.
Figure 4:
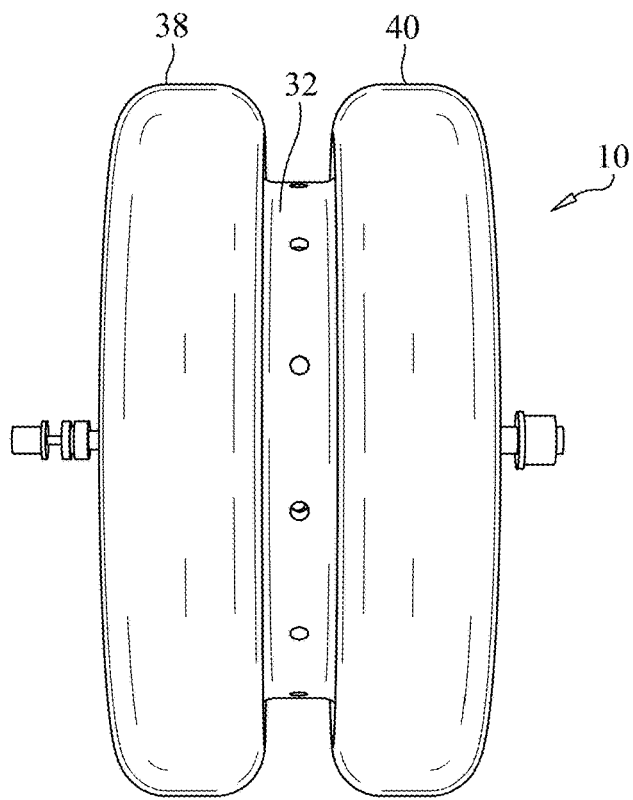
FIG. 4 is a side view of a widened rear wheel with two tires attached thereto of a bicycle having a widened rear wheel in accordance with the present invention.
Figure 5:
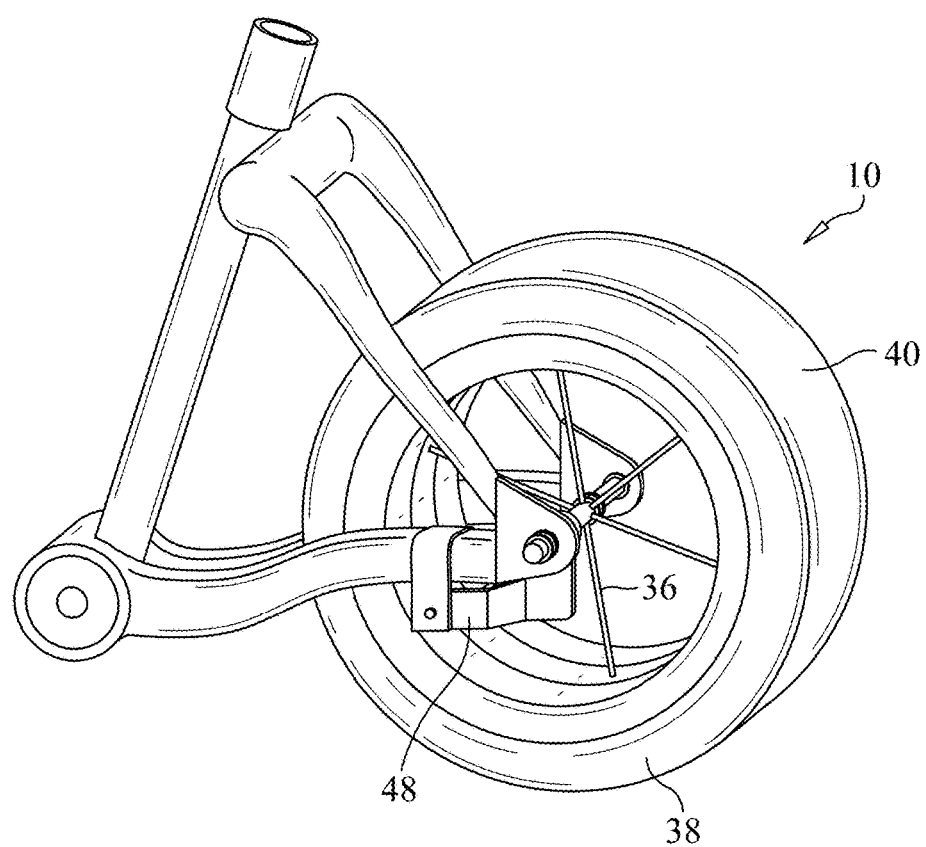
FIG. 5 is a perspective view of a widened rear wheel of a bicycle having a widened rear wheel in accordance with the present invention.
Figure 6:
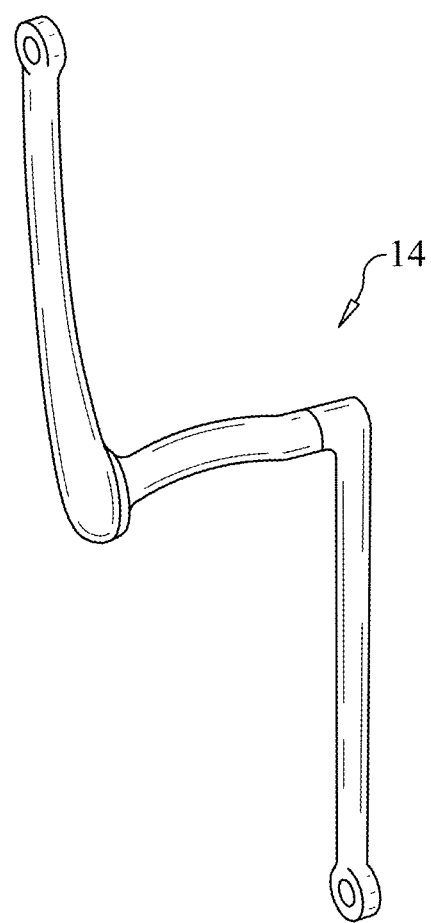
FIG. 6 is a perspective view of a widened crank of a bicycle having a widened rear wheel in accordance with the present invention.

With reference now to the drawings, and particularly to FIG. 1, there is shown a perspective view of a bicycle having a widened rear wheel 1. With reference to FIGS. 2-6, the bicycle having widened rear wheel 1 preferably includes an existing bicycle 100, a widened rear wheel 10, a widened crank tube 12, a widened crank 14 and widened rear fork 16. The existing bicycle 100 includes a bicycle frame 102, a front wheel 104, handlebars 106, and a seat 108. The bicycle frame 102 includes a frame unit 110 and a crank set 112. The crank set 112 includes a crank, bearings, a nut and other hardware. Crank sets are well known in the art and need not be explained in further detail. The frame unit 110 includes a base frame portion 114, a front fork 116 and a rear fork (not shown). The base frame portion 114 includes a top tube 117, a seat tube 118, a down tube 120 and a crank tube (not shown). The crank tube is replaced with the widened crank tube 14. The rear fork is replaced with a widened rear fork 16. The widened rear fork 16 preferably includes two rear stays 18 and a seat cross tube 20 or a stay cross 22. Each rear stay 18 includes a chain stay 24, a seat stay 26 and a rear drop out 28. One end of the chain stay 24 and the seat stay 26 extend from the rear drop out 28. Opposing ends of the two chain stays 24 are attached to the widened crank tube 14. The seat cross tube 20 is attached to an upper portion of the seat tube 118. Opposing ends of the seat stays 26 are attached to the seat cross tube 20. Each end of the stay cross tube 22 is retained between the two seat stays 26. A crank (not shown) of the crank set 112 is replaced with the widened crank 12.

Figure 7:
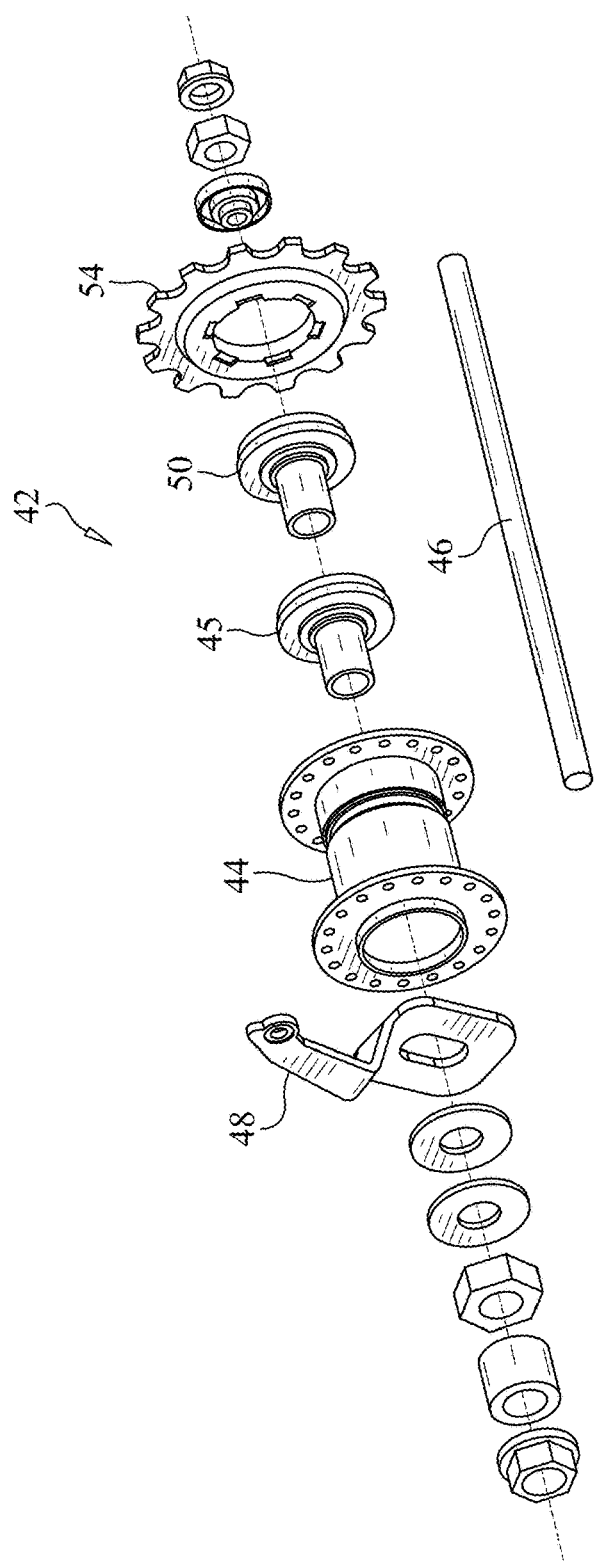
FIG. 7 is an exploded perspective view of a lengthened rear wheel hub of a bicycle having a widened rear wheel in accordance with the present invention.

With reference to FIG. 7, the widened rear wheel 10 preferably includes three bicycle tire rims 30, 32, 34, a plurality of spokes 36, two tires 38, 40 and a lengthened rear wheel hub 42. Side perimeters of the three bicycle tire rims 30, 32, 34 are attached to each other with any suitable process, such as welding to form a rear rim wheel 35. The lengthened rear wheel hub 42 preferably includes an existing coaster brake hub 44, a lengthened axle 46, an offset brake arm 48 and a second drive screw 50. The existing coaster brake hub 44 with all the internal components is well known in the art and maybe purchased from numerous manufactures, such as Shimano. An existing hub axle (not shown) is replaced with the lengthened axle 46. The existing brake arm (not shown) is replaced with the offset brake arm 48. The second drive screw 50 is concentrically attached to an end of the existing drive screw 45 with welding or the like. The lengthened rear wheel hub 42 is secured to the bicycle tire rim 32 of the rear rim wheel 35 with the plurality of spokes 36. However, the plurality of spokes 36 could be replaced with some other type of hub support device, such as a disc or solid spokes as opposed to wire spokes. The disc would include an outside perimeter attached to the bicycle tire rim 32 and the inside attached to the lengthened rear wheel hub 42. The two tires 38, 40 are secured to the two outer bicycle tire rims 30, 34 and preferably include inner tubes (not shown). The lengthened axle 46 is secured to the two rear drop outs 28. The offset brake arm 48 is secured to one of the chain stays 24 with a brake strap (not shown). A chain 52 is attached to a driven gear 54 of the existing coaster brake hub 44 and a drive gear 56 of the crank set 112. The bicycle having a widened rear wheel 1 does not require a kick stand, but will stand on its own. The widened rear wheel 10 provides resting stability.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A widened rear wheel for a bicycle, comprising:
a middle rim;
two outside rims are attached to opposing sides of said middle rim to create a rear rim wheel, wherein said two outside rims are capable of retaining a tire;
a wheel hub is capable of being rotatably mounted to a bicycle frame of a bicycle; and
a hub support device, wherein said wheel hub is retained by said hub support device, said rear rim wheel is secured to said hub support device;
said wheel hub is a coaster brake hub; and
said wheel hub includes a first drive screw, a second drive screw is attached to end of said first drive screw.

2. The widened rear wheel for a bicycle of claim 1, further comprising:
a bicycle frame includes a frame unit and a crank set, said frame unit includes a base frame portion, a front fork and a widened rear fork, said widened rear fork is sized to receive a width of said wheel hub.

3. The widened rear wheel for a bicycle of claim 2 wherein:
said base frame portion includes a widened crank tube, which replaces a normal width crank tube.

4. The widened rear wheel for a bicycle of claim 2 wherein:
said crank set includes a widened crank, which replaces a normal width crank.

5. The widened rear wheel for a bicycle of claim 1 wherein:
said wheel hub includes an offset brake arm.

6. A widened rear wheel for a bicycle, comprising:
a middle rim;
two outside rims are attached to opposing sides of said middle rim, wherein said two outside rims are capable of retaining a tire;
a wheel hub is capable of being rotatably mounted to a bicycle frame of a bicycle; and
a plurality of spokes having one end retained by said wheel hub, an opposing end of said plurality of spokes are secured to substantially a center of said middle rim.

7. The widened rear wheel for a bicycle of claim 6, further comprising:
a bicycle frame includes a frame unit and a crank set, said frame unit includes a base frame portion, a front fork and a widened rear fork, said widened rear fork is sized to receive a width of said wheel hub.

8. The widened rear wheel for a bicycle of claim 7 wherein:
said base frame portion includes a widened crank tube, which replaces a normal width crank tube.

9. The widened rear wheel for a bicycle of claim 7 wherein:
said crank set includes a widened crank, which replaces a normal width crank.

10. The widened rear wheel for a bicycle of claim 6 wherein:
said wheel hub is a coaster brake hub.

11. The widened rear wheel for a bicycle of claim 10 wherein:
said wheel hub includes an offset brake arm.

12. A widened rear wheel for a bicycle, comprising:
a middle rim;
two outside rims are attached to opposing sides of said middle rim, wherein said two outside rims are capable of retaining a tire;
a wheel hub is capable of being rotatably mounted to a bicycle frame of a bicycle; and
a plurality of spokes having one end retained by said wheel hub, an opposing end of said plurality of spokes are secured to substantially a center of said middle rim, said wheel hub is substantially center relative to a width of said middle rim.

13. The widened rear wheel for a bicycle of claim 12, further comprising:
a bicycle frame includes a frame unit and a crank set, said frame unit includes a base frame portion, a front fork and a widened rear fork, said widened rear fork is sized to receive a width of said wheel hub.

14. The widened rear wheel for a bicycle of claim 13 wherein:
said base frame portion includes a widened crank tube, which replaces a normal width crank tube.

15. The widened rear wheel for a bicycle of claim 12 wherein:
said crank set includes a widened crank, which replaces a normal width crank.

16. The widened rear wheel for a bicycle of claim 12 wherein:
  said wheel hub is a coaster brake hub.

17. The widened rear wheel for a bicycle of claim 16 wherein:
  said wheel hub includes an offset brake arm.

\* \* \* \* \*